No. 848,978. PATENTED APR. 2, 1907.
J. DONOGHUE.
METHOD OF SOLDERING SHEET METAL PLATES.
APPLICATION FILED AUG. 17, 1906.

Witnesses
M. Schmidt
Geo. E. Tew

Inventor
James Donoghue
By Milo B. Stevens & Co.
Attorneys

UNITED STATES PATENT OFFICE.

JAMES DONOGHUE, OF CLEVELAND, OHIO.

METHOD OF SOLDERING SHEET-METAL PLATES.

No. 848,978.　　　　　Specification of Letters Patent.　　　　Patented April 2, 1907.

Application filed August 17, 1906. Serial No. 331,011.

*To all whom it may concern:*

Be it known that I, JAMES DONOGHUE, a citizen of the United States, residing at Cleveland, in the county of Cuyahoga and State of Ohio, have invented new and useful Improvements in Methods of Soldering Sheet-Metal Plates, of which the following is a specification.

This invention relates to a process of soldering sheet-metal plates, and is particularly applicable to a method for producing the joints of sheets used for eaves-troughs or roofs; but it is also applicable to sheet-metal cans and various other articles or structures.

It is common to make an ordinary lock-joint in a tin gutter or roof by turning in the edges of the sheet metal and hooking the same together and then soldering the same on one side or between one fold and the adjacent portion of the sheet or plate, the seam being compressed or flattened, as usual. By this construction the body of one of the plates or sheets is not attached to the hook portion of the other sheet, and when the sheets are exposed to heat or cold the expansion and contraction will cause a bend at the seam, which frequently results in cracking at the bend of the upper sheet, which lets in water and causes a leaky seam. It is also known in the art to solder the seam on both sides; but this is expensive, because the plates after being soldered on one side have to be turned over and the operation repeated at all the seams, which takes time and is doubly expensive.

It is the object of my invention to solder a lock-seam in such manner that all the parts of the seam are soldered together, forming a seam which will be waterproof on both sides and which will prevent warping or cracking at the bend and in which the soldering on all sides can be effected at a single operation.

This object is effected by the use of a prepared strip or ribbon of solder having the same shape as the seam, so as to fit within the folds thereof.

The invention is illustrated in the accompanying drawings, in which—

Figure 1:
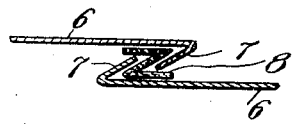
Figure 2:
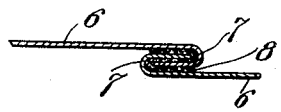
Figure 3:
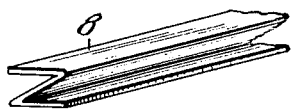

Figure 1 is a sectional view of an ordinary lock-seam before being compressed and provided with the ribbon or strip of solder. Fig. 2 is a similar view of the compressed and completed seam. Fig. 3 is a perspective view of a piece of the solder strip ready for use.

In the drawings the sheet-metal plates are indicated at 6, and these are bent at the edges or sides, as at 7, to form hooks which interlock with each other in the usual manner. The strip or ribbon of solder is indicated at 8, and it is formed or made in substantially a Z shape, so as to fill the space between all the folds of the upper and lower sheets. In performing the method the edges are turned to form the hooks in the usual manner, and the prepared strip of solder is then slipped in position in one of the hooks and the hook or edge of the other plate is then interlocked with the solder between the folds. Heat and pressure is then applied, which flattens down the seam and liquefies the solder, so that it adheres in the seam and fills the same completely, as indicated in Fig. 2. Now it will be seen that with a seam so constructed the plates cannot warp or crack at the bend of the hooks, where the crack usually occurs, when either layer or plate is left unsoldered, because the solder extends beyond said bend on each plate. The solder fills all three of the folds or spaces between the hooks, forming three layers, which effectively prevent any leak. The ribbon-solder can be prepared and shaped in advance, so that it can be quickly applied to the joints. The strip of solder is substantially equal in width to the length of the convolutions of the seam, and by proper manipulation and construction of the parts, together with a desirable thinness of the solder strip, running of the solder beyond the limits of the seam can be prevented, which is advantageous in can and other work where a good appearance is desirable and where it is desired that little or none of the solder shall be exposed to the contents of the can.

I am aware that the seams of sheet-metal plates have heretofore been soldered by means of a solder or composition wire folded or placed within the seam before the heat and pressure are applied, and I disclaim the same. Such a method has the objection that solder may or may not flow properly to fill the seam and may or may not get the solder in the right place. By the use of the folded strip disclosed herein the solder is applied or located just where it is wanted and fills the entire space and assures a full and tight joint after heating and pressing.

I claim—

1. The method of soldering the seams of sheet metal, consisting in folding the edges of the sheets to hook together, placing a ribbon of solder in the seam, said ribbon being folded in Z shape to fit between the folds and around both of the said edges and then applying heat and pressure.

2. The method of joining sheets of metal, consisting in bending the edges of the sheets to form hooks adapted to interlock to form a seam, inserting a strip of solder between the hooks, said strip being folded to extend around the edges of both of the sheets and beyond the bends thereof between the hook portion of each sheet and the body portion of the other, and then compressing and heating the joint to melt the solder and flatten the seam.

In testimony whereof I have signed my name to this specification in the presence of two subscribing witnesses.

JAMES DONOGHUE.

Witnesses:
 JOHN A. BOMMHARDT,
 EDITH D. COMER.